US009280469B1

(12) United States Patent
Kuang et al.

(10) Patent No.: US 9,280,469 B1
(45) Date of Patent: Mar. 8, 2016

(54) ACCELERATING SYNCHRONIZATION OF CERTAIN TYPES OF CACHED DATA

(71) Applicant: EMC Corporation, Hopkinton, MA (US)

(72) Inventors: Yaming Kuang, Shanghai (CN); Jean-Pierre Bono, Westborough, MA (US); Ye Zhang, Shanghai (CN); Alexander Daniel, Westford, MA (US); Ruijing Guo, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 317 days.

(21) Appl. No.: 13/730,017

(22) Filed: Dec. 28, 2012

(51) Int. Cl.
*G06F 12/08* (2006.01)

(52) U.S. Cl.
CPC ........ *G06F 12/0815* (2013.01); *G06F 12/0866* (2013.01)

(58) Field of Classification Search
CPC .......................... G06F 12/0806; G06F 12/0804
USPC .................. 711/113, 114, 118–146, 161–162
See application file for complete search history.

(56) References Cited

U.S. PATENT DOCUMENTS

| | | | |
|---|---|---|---|
| 6,148,368 A * | 11/2000 | DeKoning | 711/113 |
| 6,192,408 B1 | 2/2001 | Vahalia et al. | |
| 6,275,953 B1 | 8/2001 | Vahalia et al. | |
| 6,467,022 B1 * | 10/2002 | Buckland et al. | 711/113 |
| 6,507,890 B1 | 1/2003 | Morley et al. | |
| 6,567,889 B1 * | 5/2003 | DeKoning et al. | 711/114 |
| 6,611,852 B1 | 8/2003 | Morley et al. | |
| 6,816,891 B1 | 11/2004 | Vahalia et al. | |
| 6,865,650 B1 | 3/2005 | Morley et al. | |
| 7,062,675 B1 | 6/2006 | Kemeny et al. | |
| 7,475,207 B2 | 1/2009 | Bromling et al. | |
| 7,721,144 B2 | 5/2010 | Brown et al. | |
| 7,739,379 B1 | 6/2010 | Vahalia et al. | |
| 8,028,191 B2 | 9/2011 | Brown et al. | |
| 8,286,029 B2 | 10/2012 | Anderson et al. | |
| 8,327,080 B1 | 12/2012 | Der | |
| 8,402,226 B1 | 3/2013 | Faibish et al. | |
| 8,554,954 B1 | 10/2013 | Derbeko et al. | |
| 8,627,012 B1 | 1/2014 | Derbeko et al. | |
| 2002/0112125 A1 * | 8/2002 | Copeland et al. | 711/125 |
| 2003/0149843 A1 * | 8/2003 | Jarvis et al. | 711/133 |
| 2005/0055517 A1 * | 3/2005 | Olds et al. | 711/158 |
| 2005/0182906 A1 * | 8/2005 | Chatterjee et al. | 711/144 |
| 2006/0143407 A1 * | 6/2006 | Humlicek | 711/143 |
| 2006/0212651 A1 * | 9/2006 | Ashmore | G06F 11/1441 711/113 |
| 2007/0143340 A1 * | 6/2007 | Lee et al. | 707/103 R |
| 2010/0218039 A1 | 8/2010 | Brown et al. | |
| 2010/0262771 A1 * | 10/2010 | Kurashige | 711/113 |
| 2012/0297147 A1 * | 11/2012 | Mylly et al. | 711/143 |

* cited by examiner

*Primary Examiner* — Yaima Rigol
*Assistant Examiner* — Tasnina Matin
(74) *Attorney, Agent, or Firm* — BainwoodHuang (57) ABSTRACT

A technique manages data within a data storage apparatus having a cache of volatile memory and non-volatile storage. The technique involves receiving a set of write commands to write data to the non-volatile storage. The technique further involves acknowledging, in a write-back caching manner, completion of the set of write commands after the data reaches the cache of volatile memory and prior to the data reaching the non-volatile storage. The data includes host data as well as critical metadata. The technique further involves saving, after acknowledging completion of the set of write commands, the data from the cache of volatile memory to the non-volatile storage, the critical metadata being saved from the cache of volatile memory to the non-volatile storage at a quicker rate than that of the host data (i.e., accelerated synchronization of the critical metadata).

19 Claims, 4 Drawing Sheets

ACCELERATING SYNCHRONIZATION OF CERTAIN TYPES OF CACHED DATA

BACKGROUND

One conventional data storage system employs write-through caching in which the data storage system acknowledges completion of write operations after the data storage system has written data to its backing store (e.g., disk drives). With write-through caching, there is certainty that the written data has reached its final destination.

Another conventional data storage system employs write-back caching in which the data storage system acknowledges completion of write operations after the data storage system has written data to its cache (e.g., dynamic random access memory or DRAM). Write-back caching provides better response time than write-through caching. Additionally, write-back caching may involve the use of a cache mirror (i.e., a second DRAM cache) to safeguard data which has been cached, but which has not yet been written to its backing store.

SUMMARY

Unfortunately, there are deficiencies to the above-described conventional caching approaches. In particular, in connection with conventional write-through caching, the write operations may take a relatively long time to complete (e.g., writing data to magnetic disks may take several milliseconds) thus making conventional write-through caching an unpopular caching choice. Furthermore, conventional write-through caching is susceptible to torn write operations in which errors occur while writing data to the backing store. For example, during a write operation to a disk, the only copy of the data residing on disk may be damaged due to a disk head crash or other disk malfunction. Accordingly, even in conventional write-through caching situations, write operations are still susceptible to errors.

Additionally, in connection with conventional write-back caching, the cache may collect a considerable amount of important operating system data and that data may linger in the cache a relatively long amount of time before being written to the backing store. Here, there is the potential for loss of a considerable amount of important operating system data (e.g., due to failure of all of the storage processors including all caches).

In contrast to the above-described conventional caching approaches, improved techniques are directed to write-back caching with accelerated synchronization of certain types of cached data. That is, some cached data such as critical metadata (e.g., filesystem metadata, metadata from data-services, etc.) may be treated as being more vital to system operation than other cached data such as host data. To prevent loss of a large amount of this critical metadata, processing circuitry of a data storage apparatus saves the critical metadata to non-volatile storage at a rate which is faster than that for the host data. Accordingly, the critical metadata resides in the cache for a shorter amount of time on average before being synchronized to the non-volatile storage. As a result, less critical metadata collects in the cache and, in the event of a substantial system failure, is lost than would otherwise be lost if the critical metadata were treated in a similar manner to that of host data.

One embodiment is directed to a method of managing data within a data storage apparatus having a cache of volatile memory and non-volatile storage. The method includes receiving a set of write commands to write data to the non-volatile storage. The method further includes acknowledging, in a write-back caching manner, completion of the set of write commands after the data reaches the cache of volatile memory and prior to the data reaching the non-volatile storage. The data includes host data as well as critical metadata. The method further includes saving, after acknowledging completion of the set of write commands, the data from the cache of volatile memory to the non-volatile storage, the critical metadata being saved from the cache of volatile memory to the non-volatile storage at a quicker (or faster) rate than that of the host data.

Examples of critical metadata include filesystem metadata such as updates to slice allocation tables and root slices, slice marks, and the like. Other examples include data services metadata such as zero-fill contents for slices which are released back to a pool of free slices (or similar extents).

In some arrangements, saving the data from the cache of volatile memory to the non-volatile storage involves imposing a critical metadata maximum time limit on the amount of time in which the critical metadata is permitted to reside in the cache of volatile memory before being saved from the cache of volatile memory to the non-volatile storage. The critical metadata maximum time limit may a tunable parameter which is initially set as a predefined threshold, and possibly modified at a later time (e.g., by an administrator). Example times for the critical metadata maximum time limit include one minute, 45 seconds, 30 seconds, and so on.

It should be understood that latencies and irregularities data storage system operation may cause the exact time limit to deviate by a percentage error (e.g., +/−3%, +/−5%, +/−10%, etc.). In some situations, the critical metadata may reside in the cache slightly longer than the critical metadata maximum time limit before being saved to the non-volatile storage because the operation to save the critical metadata to the non-volatile storage is initiated (or triggered) by reaching the time limit (e.g., via a timer or counter).

It should be further understood that, in the cloud context, the electronic circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various processes, electronic components and circuitry which are involved in accelerating synchronization of certain types of cached data.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to write-back caching with accelerated synchronization of certain types of cached data. Along these lines, some cached data such as critical metadata (e.g., filesystem metadata, metadata from data-services, etc.) may be treated as being more vital to system operation than other cached data such as host data. To prevent loss of a large amount of this critical metadata, processing circuitry of a data storage apparatus saves the critical metadata to non-volatile storage at a rate which is faster than that for the other cached data. Accordingly, the critical metadata resides in the cache for a shorter amount of time on average before being synchronized to the non-volatile storage. As a result, in the event of a substantial system failure, less critical metadata is lost than would otherwise be lost if the critical metadata were treated in a similar manner to that of the other cached data.

Figure 1:
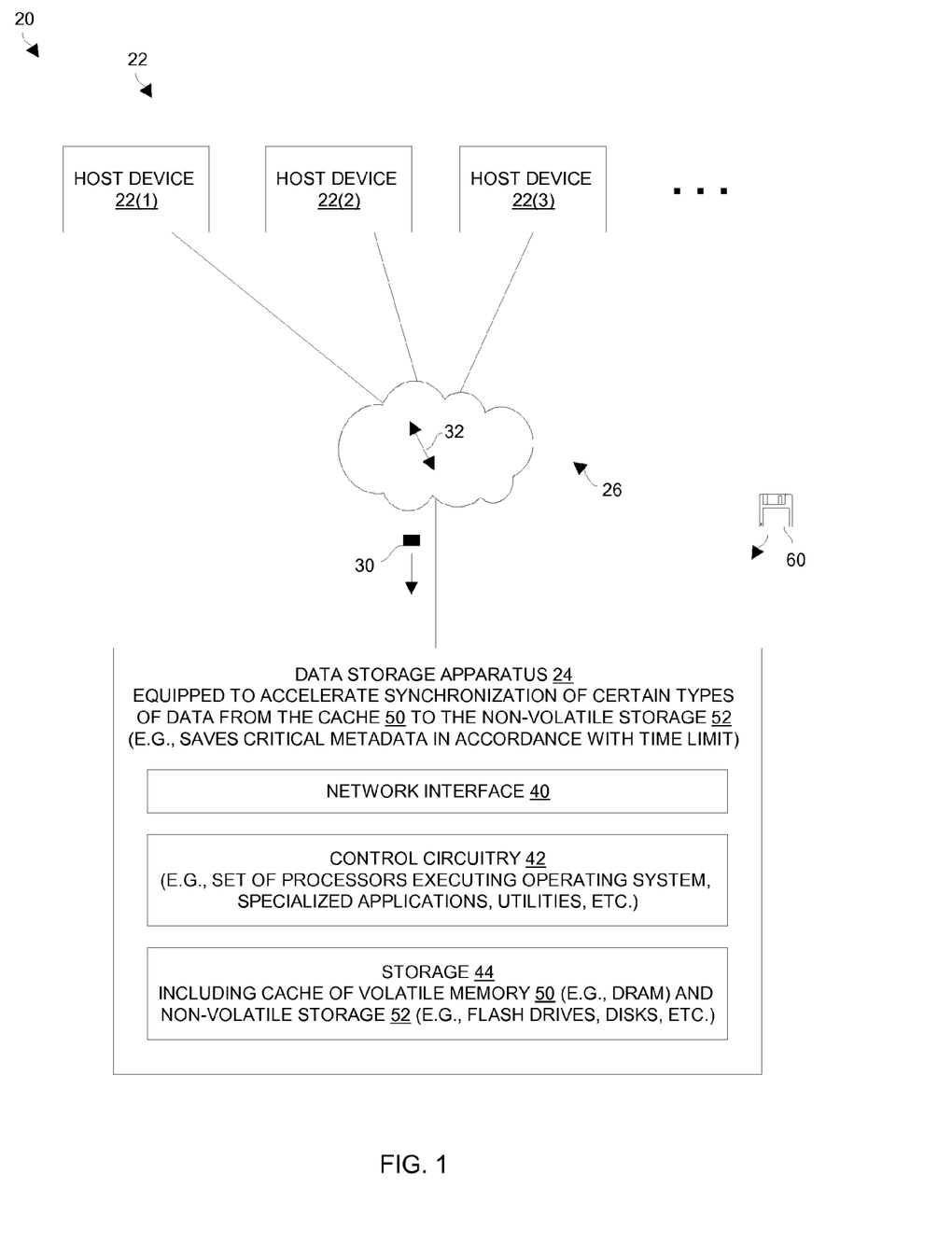
FIG. 1 is a block diagram of a data storage environment which is suitable for a data storage apparatus that performs write-back caching with accelerated synchronization of certain types of cached data.

FIG. 1 is a block diagram of a data storage environment 20 which is suitable for a data storage apparatus that performs accelerated synchronization of certain types of cached data. The data storage environment 20 includes host devices 22(1), 22(2), 22(3), . . . (collectively, host devices 22), a data storage apparatus 24, and a communications medium 26.

The host devices 22 are constructed and arranged to run host applications and provide storage commands 30 to the data storage apparatus 24 to perform useful work. Such storage commands 30 may involve writing host data (e.g., write IOs), reading host data (e.g., read IOs), and so on.

The data storage apparatus 24 is constructed and arranged to process the storage commands 30 from the host devices 22. In particular, the data storage apparatus 24 performs store and load operations on behalf of the host device 22 in a high availability manner (e.g., with fault tolerance, load balancing, etc.). During such operation, the data storage apparatus 24 may generate and update metadata which the data storage apparatus 24 uses to manage the host data.

The communications medium 26 connects the various components of the data storage environment 20 together to enable these components to exchange electronic signals 32 (e.g., see the double arrow 32). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, or combinations thereof.

As shown in FIG. 1, the data storage apparatus 24 includes a network interface 40, control circuitry 42, and storage 44, among other things. The storage 44 includes both a cache of volatile memory 50 (e.g., DRAM, SRAM, etc.) and non-volatile memory 52 (e.g., flash storage units, magnetic disk drives, etc.). The data storage apparatus 24 may include other components as well such as user input and output devices, a service processor, and so on.

The network interface 40 is constructed and arranged to connect the data storage apparatus 24 to the communications medium 26. Accordingly, the network interface 40 enables the data storage apparatus 24 to communicate with the other components of the data storage environment 20 such as the host devices 22 (e.g., file-based communications, block-based communications, combinations thereof, etc.).

The control circuitry 42 is constructed and arranged to store host data into the non-volatile storage 52, and load host data from non-volatile storage 52 on behalf of the host devices 22. Additionally, the control circuitry 42 stores and loads the metadata which is generated and updated during operation. As will be explained in further detail shortly, the control circuitry 42 performs write-back caching and accelerates synchronization of certain types of this metadata from the cache 50 to the non-volatile storage 52.

In addition to the host data and the metadata, the storage 44 is constructed and arranged to store other software such as an operating system, a set of user space applications and utilities, operating parameters, and so on. These additional software constructs may reside in either the volatile memory 50, and/or the non-volatile memory 52 at various times of operation. In some arrangements, the non-volatile memory 52 is tiered based on access speed. For example, the non-volatile memory 52 may include a first tier of flash memory, a second tier of SAS memory, and a third tier of near line SAS memory.

It should be understood that the control circuitry 42 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 60 is capable of delivering all or portions of the software to the data storage apparatus 24. The computer program product 60 has a non-transitory (or non-volatile) computer readable medium which stores a set of instructions which controls one or more operations of the data storage apparatus 24. Examples of suitable computer readable storage media include tangible articles of manufacture and apparatus which store instructions in a non-volatile manner such as CD-ROM, flash memory, disk memory, tape memory, and the like. Further details will now be provided with reference to FIG. 2.

Figure 2:
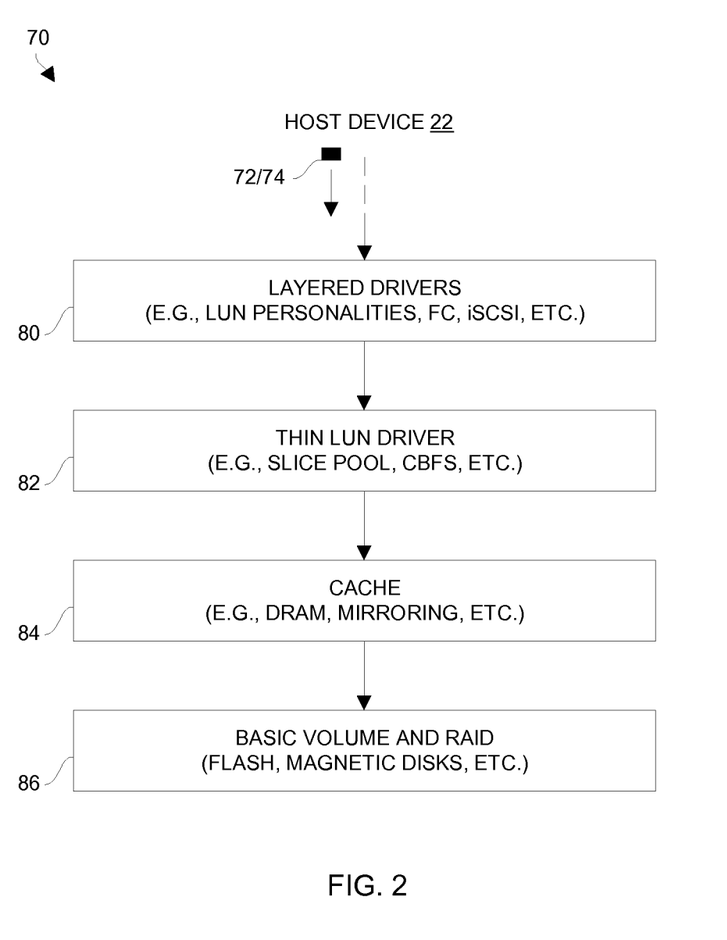
FIG. 2 is a block diagram of software stack portions of the data storage apparatus which are pertinent in handling host data written by a host device.

FIG. 2 shows pertinent components of a software stack 70 utilized by the data storage apparatus 24 to process a write command 72 which includes host data 74 from a host device 22 in a write-back caching manner (also see the storage command 30 in FIG. 1). It should be understood that this general architecture is suitable for use in a file-based context and/or in a block-based context. It should be further understood that each level of the software stack 70 may include multiple drivers for handling various tasks involved in processing the write command 72.

At level 80, layered drivers receive and interpret the write command 72 from the host device 22. This level is responsible for implementing particular host-side protocols (e.g., Fibre-Channel, iSCSI, etc.). Additionally, this level presents particular LUN personalities to the host device 22.

At level 82, the write command 72 is processed from a thin pool perspective. That is, the data storage apparatus 24 allocates slices (or extents) from a pool of free slices to provide a virtual space on the order of Petabytes. When slices are no longer used, the unused slices are returned to the pool for re-allocation. At this thin LUN driver level, the particular filesystem and/or block mappings are processed to determine the proper location(s) within the storage 44 (FIG. 1) to move the host data 74. For instance, the host data 74 may be new data requiring new empty storage. Alternatively, the host data 74 may be an update to earlier-written host data, and so on. Moreover, additional data services may need to perform operations in response to receiving the host data 74 (e.g., to preserve an earlier-taken snapshot, compression, deduplication, etc.).

At level 84, the host data 74 reaches the cache of volatile memory 50 and is scheduled to be saved in the non-volatile storage 52 (FIG. 1). At this level, the host data 74 may be mirrored to a second cache to persist the host data 74 prior to saving the host data 74 to the non-volatile storage 52 (FIG. 1). Additionally, the write command 72 may be acknowledged as being completed from the perspective of the host device 22. Moreover, with the host data 74 now residing in the cache 50, the host data 74 may be made available for subsequent reading from the cache 50 for good host data 74 read performance.

At level 86, the host data 74 is saved to the non-volatile storage 52 (i.e., "synch in place"). The various storage devices which form the non-volatile storage 52 may include flash storage units and magnetic disk drives. Such storage devices may be configured into RAID groups and operate in accordance with certain RAID levels (e.g., RAID 0, RAID 1, RAID 5, RAID 6, RAID 10, and so on). Once the host data 74 is safely written to the non-volatile storage 52, the host data 74 residing in the cache 50 may be overwritten if space is needed in the cache 50.

It should be understood that FIG. 2 depicts a simplified stack structure for purposes of description. In actual implementation, the software stack 80 may resemble FIG. 2 or may be more extensive and complex. For example, the software stack 80 may be provisioned to process storage commands 30 from multiple host devices 22 simultaneously. Moreover, some host devices 22 may be file-based while other host devices 22 are block-based. As another example, the control circuitry 42 (FIG. 1) may include multiple processors (i.e., multiple processing cores) for symmetric multiprocessing (SMP) operation, and the cache level 84 may be constructed and arranged to coordinate cache access, i.e., individual access to non-shared portions of the cache 50, sharing/locking mechanisms for access to shared portions of the cache 50, and so on.

At this point, it should be understood that the data storage apparatus 24 performs write-back caching of the host data 74. That is, each write command 72 is acknowledged as being completed once the host data 74 is safely stored in the cache memory 50.

It should be further understood that certain other types of data which is handled by the data storage apparatus 24 is deemed to be critical (i.e., high priority) and is thus saved from the cache memory 50 to the non-volatile storage 52 in a more expeditious manner. Further details of there various types of data which is deemed to be in this critical category will now be provided with reference to FIG. 3.

Figure 3:
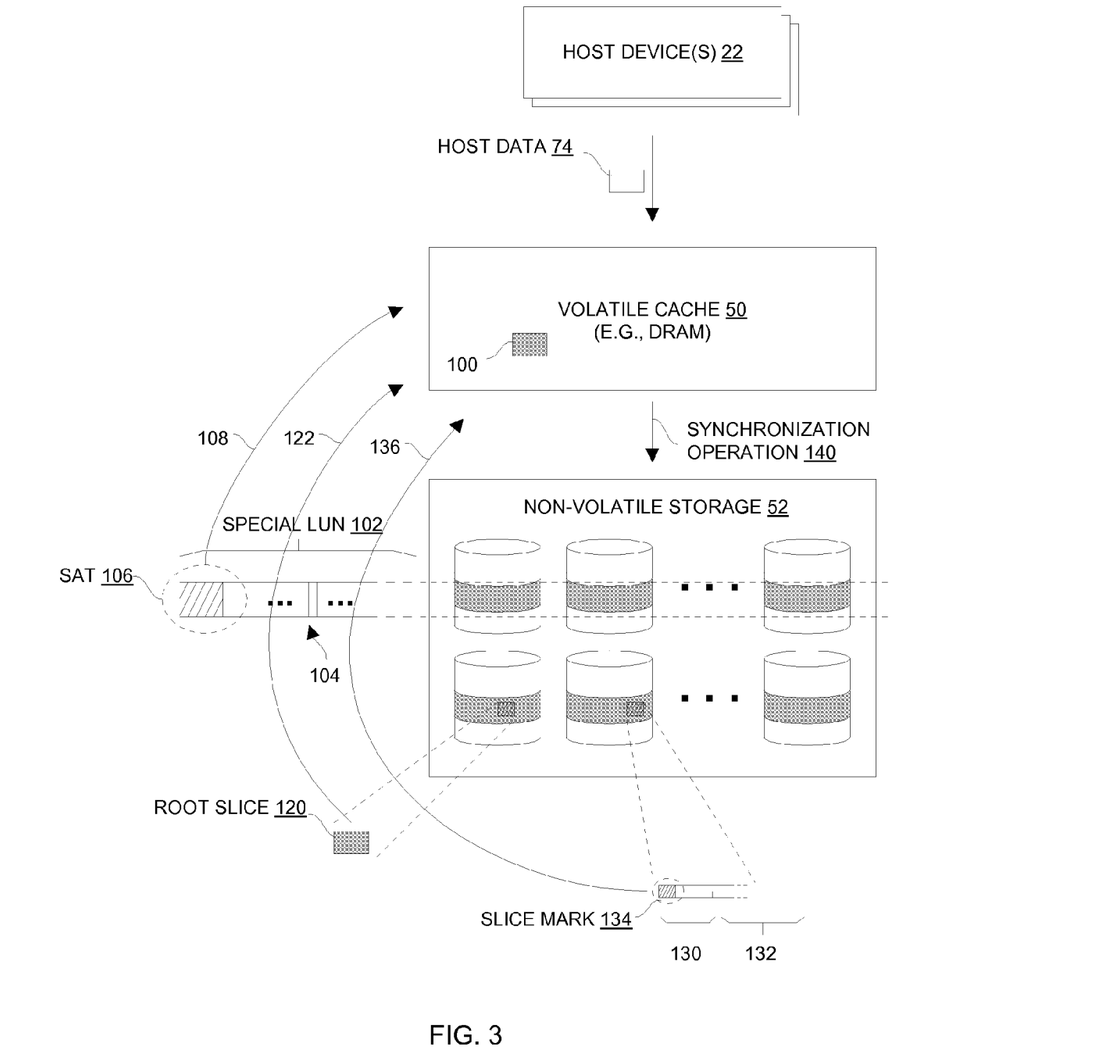
FIG. 3 is a block diagram illustrating various types of data which are cached and handled by the data storage apparatus.

FIG. 3 shows various types of data which are cached and eventually saved to the non-volatile storage 52 by the data storage apparatus 24. As mentioned earlier, the cache 50 receives host data 74 from the host devices 22. The host data 74 is synchronized to the non-volatile storage 52 at a regular rate.

In some arrangements, the control circuitry 42 of the data storage apparatus 24 imposes a time limit on the maximum amount of time that the host data 74 may reside in the cache 50 before being saved to the non-volatile storage 52. Example maximum times include 2 minutes, 3 minutes, and so on.

In other arrangements, the data storage apparatus 24 does not impose a time limit on synchronizing the host data 74 to the non-volatile storage 52. Rather, in these arrangements, the control circuitry 42 uses a best efforts approach which may save host data 74 to the non-volatile storage 52 within a particular amount of time on average (e.g., 2 minutes, 3 minutes, etc.). Here, the various operating system components are prioritized and provisioned so that synchronization of written host data 74 from the cache 50 to the non-volatile storage 52 is guaranteed to occur routinely rather than be starved out.

Additionally, the control circuitry 42 of the data storage apparatus 24 imposes a time limit (i.e., a maximum) on the amount of time that critical metadata 100 may reside in the cache 50 before being saved to the non-volatile storage 52. Example time limits include 1 minute, 45 seconds, 30 seconds, and so on.

As shown in FIG. 3, this critical metadata 100 may originate from a variety of sources. For example, the non-volatile storage 52 may be partitioned into special LUNs 102 which are not visible to the host devices 22. Rather, these special LUNs are managed by the operating system to provide various data storage features (e.g., RAID, thin pool provisioning, etc.). Here, each special LUN 102 may be partitioned into slices 104 of a standard size (e.g., 1 Gigabyte, 256 Megabytes, etc.). For each special LUN 102, a portion is dedicated to holding a slice allocation table (SAT) 106 which stores slice mapping information to track slice allocation. As illustrated by the arrow 108, updates to each SAT 106 are capable of being written to the cache 50 and are considered critical metadata 100 which should undergo accelerated synchronization from the cache 50 to the non-volatile storage 52. An example of a LUN which may be handled in this manner is a FLARE® LUN (FLU) of a FLARE Operating Environment offered by EMC Corporation of Hopkinton, Mass.

As another example, each filesystem maintained by the data storage apparatus 24 may include a root slice 120 which identifies an entry point to various locations within the special LUN 102 based on standard parameters such as device ID, offset and length. As illustrated by the arrow 122, updates to each root slice 120 are capable of being written to the cache 50 are considered critical metadata 100 which should undergo accelerated synchronization from the cache 50 to the non-volatile storage 52.

As yet another example, each slice 104 maintained by the data storage apparatus 24 may include a metadata portion 130 and a data portion 132. The data portion 132 is constructed and arranged to hold regular data (e.g., host data, application data, user data, etc.). In contrast, the metadata portion 130 is constructed and arranged to hold operating system metadata involved in storage management. A section of the metadata portion 130 includes a slice mark 134 which operates as a header portion of that slice 104 to identify certain standard parameters such as filesystem ID, offset and length. The size of each slice mark 134 may be relatively small such as 512 Kilobytes, 1 Megabyte, etc. As illustrated by the arrow 136, updates to each slice mark 130 are capable of being written to the cache 50 are considered critical metadata 100 which should undergo accelerated synchronization from the cache 50 to the non-volatile storage 52.

It should be understood that the rate at which the data storage apparatus 24 synchronizes the critical metadata 100 to the non-volatile storage 52 is faster than the regular rate at which the host data 74 is synchronized to the non-volatile storage 52. This faster rate for synchronizing the critical metadata 100 to the non-volatile storage 52 prevents the critical data 100 from collecting in the cache of volatile memory 50. Accordingly, in the event of a significant failure (e.g., a failure of all of the storage processors and caches 50), only a small amount of critical data 100 will be lost. As a result, the task of recovering data within the data storage apparatus 24 will be easier (e.g., there will be more current critical metadata 100 available from the non-volatile storage 52 to facilitate data recovery.

It should be further understood that above-mentioned SAT updates 108, root slice updates 122, and updates 136 to slice marks 134 are examples of filesystem-related critical metadata 100. That is, the information in this critical metadata 100 is used by the data storage apparatus 80 to manage robust and reliable storage of the host data 74 from the host devices 22. Even if the host devices 22 operate in a block-based context, the critical metadata 100 may be considered filesystem-related since the data storage apparatus 24 may employ filesystem technology in managing blocks of host data 74.

There can be other types of critical metadata 100 which enjoys accelerated synchronization which is not filesystem-related. In particular, the data storage apparatus 24 may include various data service components which provide important data services, and the data generated by these data service components is handled as critical metadata 100 as well. For example, when a slice 104 is released to the pool of free slices for re-allocation, the control circuitry 42 zero-fills the slice 104 (i.e., a free page or extent). Such an operation may occur when a thin LUN is destroyed or evacuated, when a file is deleted, and so on. In these situations, the control circuitry 42 may treat updates to the metadata portion and/or the data portion of the freed slices 104 as critical metadata 100 which is saved to the non-volatile storage 52 in an accelerated manner. The metadata from other high priority operating system operations are suitable as well.

It should be further understood that not all metadata is deemed critical. In particular, non-critical operating system routines of the data storage apparatus 24 may generate non-critical (or lower priority) metadata which must be eventually saved to the non-volatile storage 52 (e.g., log histories and performance monitoring entries). Such non-critical metadata may be handled in a non-accelerated manner. In some arrangements, the non-critical metadata is handled in a manner similar to that of the host data 74 (i.e., written to the non-volatile storage 52 at the same rate as that of the host data 74). In other arrangements, the non-critical metadata is handled in a manner which is different than that of the host data 74 (e.g., written to the non-volatile storage 52 at faster rate or at a slower rate than that of the host data 74) depending on the significance of the non-critical metadata vis-à-vis the host data 74. The synchronization of cached data to the non-volatile storage 52 is illustrated by the arrow 140 in FIG. 3.

There are a variety of techniques for imposing the critical metadata maximum time limit on the amount of time in which the critical metadata 100 is permitted to reside in the cache of volatile memory 50 before being saved from the cache 50 to the non-volatile storage 52. Such techniques may be implemented strictly in hardware (e.g., timers, counters, etc.), software (e.g., a special write operation called via a library routine), or combinations thereof.

In some arrangements, when the control circuitry 42 writes a slice 104 of critical metadata 100 in the cache 50, the control circuitry 42 records the modification time in the slice metadata portion 130. By policy, the modification time can be the time of the first modification or the time of the last modification. The control circuitry 42 then orders the saving of critical metadata 100 to the non-volatile storage 52 by moving that slice 104 on a time-since-last-reference ordered list. Any slices 104 that remain unreferenced are written because they are the oldest on the time-since-last-reference ordered list. Furthermore, if the critical metadata maximum time limit is exceeded, the control circuitry 42 forces the slice 104 to be written to the non-volatile storage 52 and does not grant further access to the slice 104 until the slice 104 is written to the non-volatile storage 52.

In other arrangements, the control circuitry 42 maintains a timer (or counter) circuitry for each slice 104 of critical metadata 100 written in the cache 50. If the timer for a particular slice 104 of critical metadata 100 expires or becomes substantially close to expiring (e.g., within range of the limit such as 10%), the control circuitry 42 immediately writes that slice to the non-volatile storage 52. Other mechanisms are suitable for use as well. Further details will now be provided with reference to FIG. 4.

Figure 4:
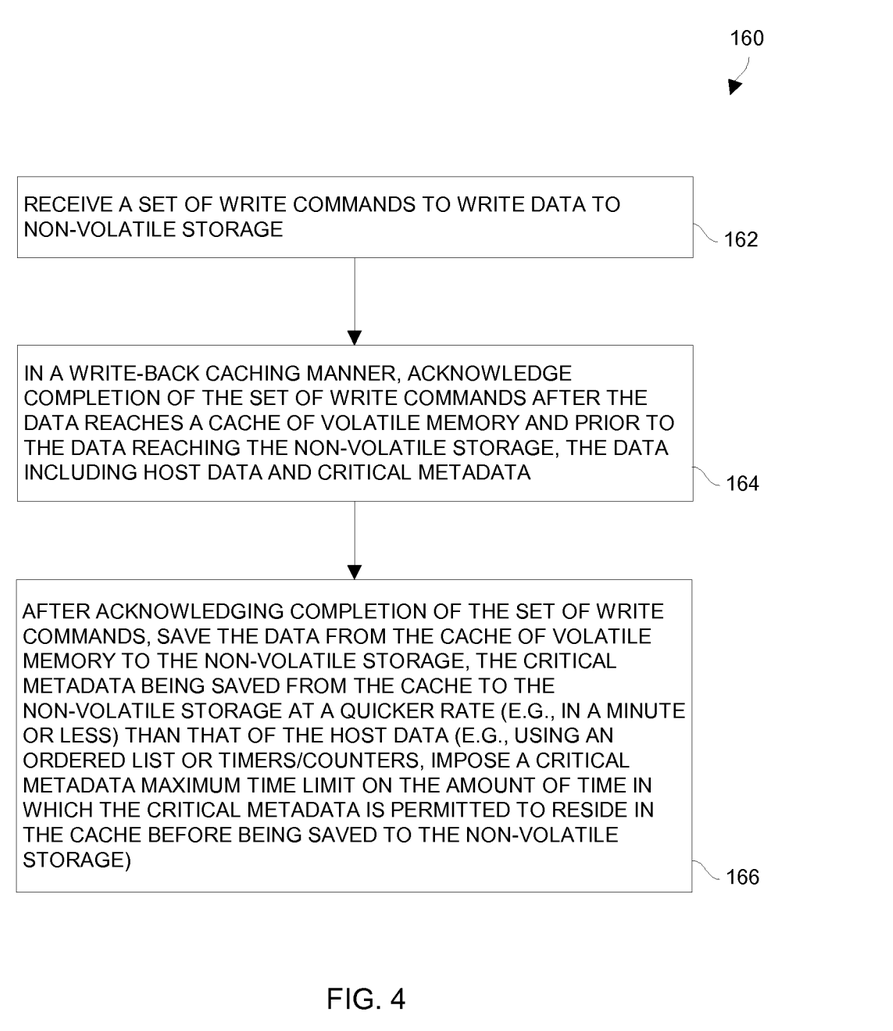
FIG. 4 is a flowchart of a procedure which is performed by the data storage apparatus.

FIG. 4 is a flowchart of a procedure 200 which is performed by the data storage apparatus 24. In step 162, the data storage apparatus 24 receives a set of write commands to write data to the non-volatile storage. Some write commands may come from external host devices 22 (FIG. 1). Other write commands may be generated internally from operating system components (FIG. 2).

In step 164, the data storage apparatus 42 acknowledges, in a write-back caching manner, completion of the set of write commands after the data reaches the cache 50 and prior to the data reaching the non-volatile storage 52. It should be understood that this data includes host data 74 as well as critical metadata 100 (FIG. 3).

In step 166, the data storage apparatus 42 saves, after acknowledging completion of the set of write commands, the data from the cache 50 to the non-volatile storage 52. In particular, the critical metadata 100 is saved from the cache 50 to the non-volatile storage 52 at a quicker rate than that of the host data 74. For example, using an ordered list or timers/counters, the data storage apparatus 42 imposes a critical metadata maximum time limit on the amount of time in which the critical metadata 100 is permitted to reside in the cache 50 before being saved to the non-volatile storage 52. It should be understood that the above-described operation is ongoing. That is, the data storage apparatus 42 continues to store and retrieve host data 74 from one or more host devices 22. Additionally, the data storage apparatus 42 continues to generate and update critical metadata 100. During such operation, the data storage apparatus 42 synchronizes the critical metadata 100 from the cache 50 to non-volatile storage 52 at a faster rate than that for the host data 74.

As described above, improved techniques are directed to write-back caching with accelerated synchronization of certain types of cached data. That is, some cached data such as critical metadata 100 (e.g., filesystem metadata, metadata from data-services, etc.) may be treated as being more vital to system operation than other cached data such as host data 74. To prevent loss of a large amount of this critical metadata 100, processing circuitry of a data storage apparatus 24 saves the critical metadata 100 to non-volatile storage 52 at a rate which is faster than that for the host data 74. Accordingly, the critical metadata 100 resides in the cache 50 for a shorter amount of time on average before being synchronized to the non-volatile storage 52. As a result, there is less critical metadata 100 that collects in the cache 50 and, in the event of a substantial system failure, there is less critical metadata 100 that is lost than would otherwise be lost if the critical metadata 100 were treated in a similar manner to that of host data 74.

While various embodiments of the present disclosure have been particularly shown and described, it will be understood by those skilled in the art that various changes in form and details may be made therein without departing from the spirit and scope of the present disclosure as defined by the appended claims.

For example, the control circuitry 42 of the data storage apparatus 24 was described above as synchronizing critical metadata 100 from the cache 50 to non-volatile storage 52 at a faster rate than synchronizing host data 74. In some arrangements, the control circuitry 42 performs write-through caching of the critical metadata 100 while performing write-back caching of the host data 74. In these arrangements, the write commands which involve write-through caching of the critical metadata 100 are not considered complete until the critical metadata 100 reaches its final destination in the non-volatile storage 52.

Additionally, the critical metadata 100 was described above as being given a higher priority in terms of synch in place than the host data 74. It should be understood that the host data 74 may refer to a variety of different types of data that is not involved in the data storage function of the data storage apparatus 42. Along these lines, the host data 74 may refer to application data, user IO data, lower priority data generated from the user space of the data storage apparatus 42, and so on. Such modifications and enhancements are intended to belong to various embodiments of this disclosure.

What is claimed is:

1. A method of managing data within a data storage apparatus having a cache of volatile memory and non-volatile storage, the method comprising:
   receiving, from a set of external host devices, a set of host write commands to write data to the non-volatile storage;
   in a write-back caching manner, acknowledging completion of the set of host write commands after the data reaches the cache of volatile memory and prior to the data reaching the non-volatile storage, the data including host data and critical metadata; and
   after acknowledging completion of the set of host write commands, saving the data from the cache of volatile memory to the non-volatile storage, the critical metadata being saved from the cache of volatile memory to the non-volatile storage at a quicker rate than that of the host data;
   wherein the data storage apparatus is a data storage array having multiple storage devices;
   wherein receiving the set of host write commands includes obtaining a particular host write command from a host computer over a communications medium connecting the host computer to the data storage array; and
   wherein saving the data includes, in response to the particular host write command from the host computer, writing, as the critical metadata, operating system information to the multiple storage devices ahead of writing the host data to the multiple storage devices.

2. A method as in claim 1 wherein saving the data further includes:
   imposing a critical metadata maximum time limit on the amount of time in which the critical metadata is permitted to reside in the cache of volatile memory before being saved from the cache of volatile memory to the non-volatile storage.

3. A method as in claim 2 wherein the operating system information is provided from an operating system executing on the data storage apparatus;
   wherein the host data is provided from the set of external host devices; and
   wherein saving the data from the cache of volatile memory to the non-volatile storage includes synchronizing at least some of the host data from the cache to the non-volatile storage after that host data has resided in the cache of volatile memory longer than the critical metadata maximum time limit.

4. A method as in claim 3 wherein a set of applications executes on the set of external host devices;
   wherein the host data includes application data generated from the set of applications executing on the set of external host devices;
   wherein receiving the set of host write commands to write data to the non-volatile storage includes receiving small computer system interface (SCSI) write commands from the set of external host devices; and
   wherein the critical metadata maximum time limit substantially equals one minute.

5. A method as in claim 2 wherein the data further includes non-critical metadata provided from the operating system executing on the data storage apparatus; and
   wherein saving the data from the cache of volatile memory to the non-volatile storage includes synchronizing at least some of the non-critical metadata from the cache to the non-volatile storage after that non-critical metadata has resided in the cache of volatile memory longer than the critical metadata maximum time limit.

6. A method as in claim 5 wherein a set of non-critical operating system routines executes on the data storage apparatus;
   wherein the non-critical metadata includes low performance operating system metadata generated from the set of non-critical operating system routines; and
   wherein the critical metadata maximum time limit substantially equals one minute.

7. A method as in claim 2 wherein the data further includes non-critical metadata;
   wherein the operating system information and the non-critical metadata are provided from an operating system executing on the data storage apparatus;
   wherein the host data is provided from the set of external host devices; and
   wherein saving the data from the cache of volatile memory to the non-volatile storage further includes synchronizing (i) at least some of the host data and (ii) at least some of the non-critical metadata from the cache to the non-volatile storage after that host data and that non-critical metadata have resided in the cache of volatile memory longer than the critical metadata maximum time limit.

8. A method as in claim 7 wherein imposing the critical metadata maximum time limit includes:
   ensuring that all of the critical metadata is synchronized from the cache to the non-volatile storage before the critical metadata maximum time limit expires for that critical metadata.

9. A method as in claim 8 wherein the critical metadata includes file system metadata and data-services metadata which is managed by the operating system of the executing on the data storage apparatus; and
   wherein the critical metadata maximum time limit substantially equals one minute.

10. A method as in claim 8, further comprising:
    encountering a failure of the cache of volatile memory; and
    wherein ensuring that all of the critical metadata is synchronized from the cache to the non-volatile storage before the critical metadata maximum time limit expires minimizes critical metadata loss due to the failure of the cache of volatile memory.

11. A method as in claim 8 wherein the data storage apparatus is constructed and arranged to maintain multiple specialized logical units of storage (LUNs) striped across a redundant array of independent device (RAID) group of storage devices;

wherein each specialized LUN striped across the RAID group includes (i) a set of slices to hold information, and (ii) a slice allocation table (SAT) which tracks allocation of that set of slices; and     wherein ensuring that all of the critical metadata is synchronized from the cache to the non-volatile storage before the critical metadata maximum time limit expires for that critical metadata includes copying updated SAT information from the cache to the non-volatile storage.

12. A method as in claim 8 wherein the data storage apparatus is constructed and arranged to maintain multiple specialized logical units of storage (LUNs) striped across a redundant array of independent device (RAID) group of storage devices;

wherein each specialized LUN striped across the RAID group includes a set of slices, each slice having (i) a slice mark portion to hold information regarding that slice and (ii) data portion to hold information; and     wherein ensuring that all of the critical metadata is synchronized from the cache to the non-volatile storage before the critical metadata maximum time limit expires for that critical metadata includes copying updated slice mark portions from the cache to the non-volatile storage.

13. A method as in claim 8 wherein acknowledging completion of the set of host write commands after the data reaches the cache of volatile memory and prior to the data reaching the non-volatile storage includes:

mirroring contents of the cache of volatile memory to persist the data after the data reaches the cache of volatile memory.

14. A method as in claim 8, further comprising:

after all of the critical metadata has been synchronized from the cache to the non-volatile storage, maintaining the data in the cache of volatile memory and processing a read command by reading at least a portion of the data from the cache of volatile memory in response to a cache hit.

15. A method as in claim 1 wherein the data storage array is equipped with an operating system which performs data recovery in response to a failure; and     wherein writing the operating system information includes writing operating system parameters to the multiple storage devices, the operating system parameters being used to reconstruct the host data during data recovery.

16. A data storage apparatus, comprising:

a cache of volatile memory;

non-volatile storage; and control circuitry coupled to the cache of volatile memory and the non-volatile storage, the control circuitry being constructed and arranged to:

receive a set of host write commands to write data to the non-volatile storage;

in a write-back caching manner, acknowledge completion of the set of host write commands after the data reaches the cache of volatile memory and prior to the data reaching the non-volatile storage, the data including host data and critical metadata; and after acknowledging completion of the set of host write commands, save the data from the cache of volatile memory to the non-volatile storage, the critical metadata being saved from the cache of volatile memory to the non-volatile storage at a quicker rate than that of the host data;

wherein the data storage apparatus is a data storage array;

wherein the non-volatile storage includes multiple storage devices;

wherein the control circuitry, when receiving the set of host write commands, is constructed and arranged to obtain a particular host write command from a host computer over a communications medium connecting the host computer to the data storage array; and wherein the control circuitry, when saving the data, is constructed and arranged to write, in response to the particular host write command from the host computer and as the critical metadata, operating system information to the multiple storage devices ahead of writing the host data to the multiple storage devices.

17. A data storage apparatus as in claim 16 wherein the control circuitry, when saving the data, is further constructed and arranged to:

impose a critical metadata maximum time limit on the amount of time in which the critical metadata is permitted to reside in the cache of volatile memory before being saved from the cache of volatile memory to the non-volatile storage.

18. A computer program product having a non-transitory computer readable medium which stores a set of instructions to process host write commands, the set of instructions, when carried out by computerized circuitry, causing the computerized circuitry to perform a method of:

receiving a set of host write commands to write data to non-volatile storage;

in a write-back caching manner, acknowledging completion of the set of host write commands after the data reaches a cache of volatile memory and prior to the data reaching the non-volatile storage, the data including host data and critical metadata; and     after acknowledging completion of the set of host write commands, saving the data from the cache of volatile memory to the non-volatile storage, the critical metadata being saved from the cache of volatile memory to the non-volatile storage at a quicker rate than that of the host data wherein the computerized circuitry forms part of a data storage array having multiple storage devices;

wherein receiving the set of host write commands includes obtaining a particular host write command from a host computer over a communications medium connecting the host computer to the data storage array; and wherein saving the data includes, in response to the particular host write command from the host computer, writing, as the critical metadata, operating system information to the multiple storage devices ahead of writing the host data to the multiple storage devices.

19. A computer program product as in claim 18 wherein saving the data further includes:

imposing a critical metadata maximum time limit on the amount of time in which the critical metadata is permitted to reside in the cache of volatile memory before being saved from the cache of volatile memory to the non-volatile storage.

\* \* \* \* \*